United States Patent
Sigg et al.

(10) Patent No.: US 8,504,022 B1
(45) Date of Patent: *Aug. 6, 2013

(54) IDENTIFYING OUTBOUND-ROAMING LOCATIONS IN A WIRELESS-COMMUNICATIONS NETWORK

(75) Inventors: Jason Peter Sigg, Olathe, KS (US); Anoop Kumar Goyal, Overland Park, KS (US); Mark Lee Yarkosky, Overland Park, KS (US); Joe Ben Quint, Lenexa, KS (US); Scott David Boxberger, Overland Park, KS (US); Thomas James Linnemeyer, Naperville, IL (US)

(73) Assignee: Sprint Communications Company L.P., Overland Park, KS (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/290,619

(22) Filed: Nov. 7, 2011

Related U.S. Application Data

(63) Continuation of application No. 12/395,025, filed on Feb. 27, 2009, now Pat. No. 8,055,259.

(51) Int. Cl.
*H04W 4/00* (2009.01)
*H04M 1/66* (2006.01)
*H04M 11/00* (2006.01)
*H04M 15/00* (2006.01)

(52) U.S. Cl.
USPC ............ 455/432.1; 455/433; 455/432.3; 455/410; 455/405; 379/112.1; 379/133; 379/139

(58) Field of Classification Search
USPC ........................................ 455/432.1
See application file for complete search history.

(56) References Cited

U.S. PATENT DOCUMENTS

| 7,801,523 | B1* | 9/2010 | Kenderov | 455/432.3 |
| 2003/0027572 | A1* | 2/2003 | Karlsson et al. | 455/433 |
| 2005/0186939 | A1* | 8/2005 | Barnea et al. | 455/405 |
| 2005/0233740 | A1* | 10/2005 | Jiang | 455/432.1 |
| 2007/0072587 | A1* | 3/2007 | Della-Torre | 455/410 |

FOREIGN PATENT DOCUMENTS

EP  2209331 A1 * 2/2009

* cited by examiner

*Primary Examiner* — Patrick N. Edouard
*Assistant Examiner* — Timothy Pham

(57) ABSTRACT

Methods, systems, and media for identifying areas of outbound roaming on a wireless network are disclosed. A roaming-network event record listing roaming events of subscribers of a home network is received. A home-network event record listing network events on a home network is also received. The two records are correlated to identify roaming events and network events having matching caller identifiers and time stamps within a predetermined range. Location data of a network event is adopted as location data for a matching roaming event. A home-network wireless-communications antenna, tower, or station having a service area in which a concentration of roaming events have occurred is identified. The distance of the roaming events from the antenna is determined and distance bands corresponding to that distance are plotted on a map to aid in identifying locations at which outbound roaming has occurred.

9 Claims, 8 Drawing Sheets

US 8,504,022 B1

IDENTIFYING OUTBOUND-ROAMING LOCATIONS IN A WIRELESS-COMMUNICATIONS NETWORK

CROSS-REFERENCE TO RELATED APPLICATIONS

This application is a continuation of and claims priority to co-pending U.S. patent application Ser. No. 12/395,025, filed Feb. 27, 2009, the disclosure of which is hereby incorporated herein in its entirety by reference.

BACKGROUND

Roaming occurs in a wireless network when a mobile device, such as a wireless phone, personal digital assistant (PDA), or other wireless device connects to a network other than that to which it is subscribed. Many wireless-network providers have contracted with each other to allow customers of a first network to use the services of a second network for a fee. By such agreements, the wireless-network providers pay each other for their subscribers' usage of other wireless networks.

By negotiating agreements with other wireless networks providers a single provider is able to offer continuity of service over a larger area without having to build out its own wireless network. A provider may thus, weigh the costs of paying roaming fees to other providers versus costs such as building out new wireless antennas and towers.

SUMMARY

Embodiments of the invention generally relate to systems and computer-readable media for generating distance bands to aid in locating areas in which outbound roaming has occurred within a wireless-communications network. The location of callers making outbound roaming events is first identified by comparing a roaming-network event record to a home-network event record. Home-network antennas are identified that service areas in which the outbound roaming events were made. The distance from the roaming event location to a respective home-network tower is determined and distance bands are generated therefrom. The distance bands are plotted on a map, thereby allowing areas or specific locations of outbound roaming to be identified.

This Summary was provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

DESCRIPTION OF THE DRAWING

Illustrative embodiments of the invention are described in detail below with reference to the attached drawing figures, wherein.

DETAILED DESCRIPTION

Figure 1:
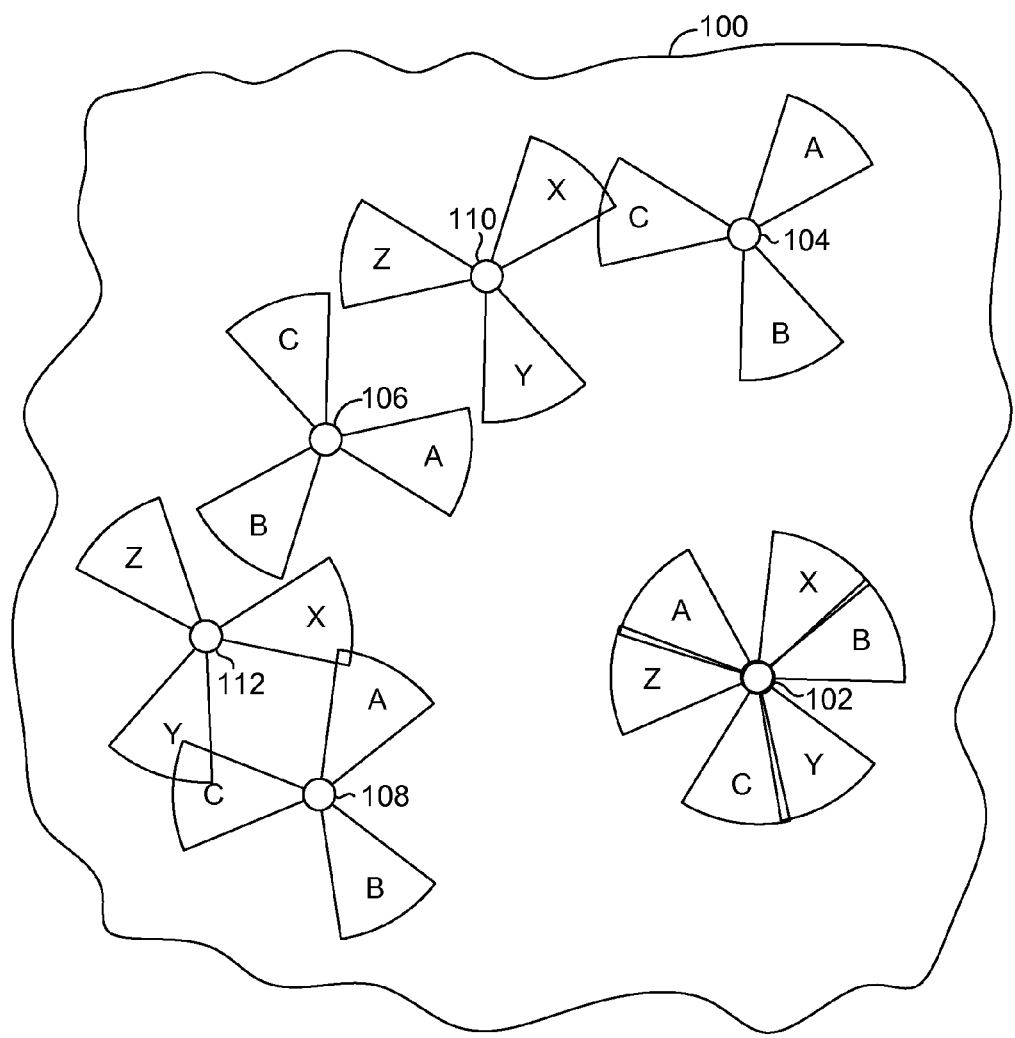
FIG. 1 is an illustration of a wireless-network environment suitable for use in implementing embodiments of the invention.

The subject matter of embodiments of the invention is described with specificity herein to meet statutory requirements. However, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention may include: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention provide systems, and computer-readable media for generating distance bands on a map to identify areas of outbound roaming on a wireless-communications network. In one embodiment, computer-readable media having computer-executable instructions embodied thereon that, when executed, perform a method for generating distance bands on a map to identify areas of outbound roaming on a wireless network is described. A roaming-network event record is received listing roaming data for roaming events on a roaming network. The roaming data includes a first caller identifier and a first time stamp for each roaming event in the roaming-network event record. A home-network event record is received listing home-network data for network events made on a home network. The data includes a second caller identifier, a second time stamp and location data for each network event in the home-network event record.

Location data for the roaming events is determined by correlating the roaming data for the roaming events with the home-network data for the network events. Home-network antennas having a concentration of roaming events within various service areas are identified. A given home-network antenna is respectively associated with a corresponding service area. For the service area, distances indicating the separation that a given roaming event is from a corresponding home-network antenna is determined. A set of distance bands is determined based on the distances. The set of distance bands is plotted on a map.

In another embodiment, a system for generating distance bands on a map to identify areas of outbound roaming on a wireless network is described. The system includes a receiving component, a location determining component, and a distance band generating component. The receiving component is configured to receive a roaming-network event record and a home-network event record. The roaming-network event record lists roaming data which is associated with outbound roaming events on a roaming network. The roaming data includes a first caller identifier and a first time stamp for each outbound roaming event in the roaming-network event record. The home-network event record lists home-network data that describes network events made on a home network including a second caller identifier, a second time stamp, and location data for each network event in the home-network event record. The location determining component is configured to determine location data for outbound roaming event by performing a first process. The first process includes identifying outbound roaming events in the roaming-network event record having a first caller identifier matching a second caller identifier of at least one of the network events in the home-network event record and having a first time stamp within a predetermined range of a second time stamp of the network event in the home-network event record. The location data of the network event in the home-network event record having a matching second caller identifier and having a second time stamp within the predetermined range is adopted for each corresponding identified outbound roaming event. The distance band generating component is configured to perform a second process. The second process includes identify home-network antennas having a concentration of roaming events within various service areas. A given home-network antenna is respectively associated with a corresponding service area. For the given service area, the distance band generating component determines distances. Each distance indicates a separation that a given roaming event is from a corresponding home-network antenna. A set of distance bands is determined based on the distances. The set of distance bands is plotted on a map.

In another embodiment, computer-readable media, having computer-executable instructions embodied thereon, that when executed, perform a method for generating distance bands on a map to identify outbound roaming locations in a wireless network is described. A home-network wireless-communications antenna having a concentration of outbound roaming events within a respective service area is identified. An outbound roaming event occurs when a subscriber of a home network connects to a roaming network while within a service area of the home network. Distances are determined. Each distance indicates a separation that each of the outbound roaming events is from the home-network wireless-communications antenna, and each distance identifies a radius of a distance band about the home-network wireless-communications antenna. Distance band arc polygons in which a significant portion of the outbound roaming events are located are generated. A distance band arc polygon is identified by the intersection of at least two distance bands and the service area of the home-network wireless-communications antenna. The distance band arc polygons are plotted on a map. Locations within the distance band arc polygons at which outbound roaming events have occurred are identified.

A roaming event or network event may be any change in the status of a wireless device's connection to a wireless-communications network. An event may be described as a phone call, a connection to data services, or other connection to a wireless-communications network, or may be identified as an initiation or termination of such a connection to a wireless-communications network. Roaming events and network events are described herein as call events created by a user making a phone call from a wireless phone on a wireless-communications network, but it is understood that any wireless-communications network event is suitable for use in applications of embodiments of the invention. Moreover, the terms "event" and "call" are used interchangeably throughout the description, but such is not intended to imply any restriction on the type of event suitable for use in embodiments of the invention.

Outbound roaming occurs when a caller subscribed to a home network places a call on a network other than the home network while within an area serviced by one or more home-network antennas. A home network, as referred to herein, is descriptive of a wireless-communications network to which a user is subscribed for wireless-communications service and is not intended to imply any relation to a user's home or dwelling. Wireless network providers generally wish to eliminate outbound roaming, because the provider does not want to pay another provider for usage of the other's network when an event occurs within an area in which the provider has attempted to make service available. A user having a subscription to a home network may place an outbound roaming call when, for example and not limitation, the user's wireless device cannot find a home-network signal, a home-network signal is weak or intermittent, or the user's wireless device does not properly search for a home-network signal. A home-network signal might be weak or not found even within a service area of a home-network antenna where for example, a structure, building, or feature of the landscape blocks the signal. Additionally, other signals or energies may interfere with the signal, or the number of connections being serviced by an antenna may decrease the size of the antenna's service area, among others.

A wireless device, such as that described above, may be any wireless phone, cellular phone, personal digital assistant (PDA), BlackBerry® device, wireless enabled media player, or other device configured to communicate over a wireless network. Such communication may be voice, data, image, video, or other type of data and may utilize services and protocols to enable short message service (SMS), text messaging, email, packet switching for Internet access, and multimedia messaging service (MMS), among others.

A wireless network may comprise any wireless-communications network configured to transmit and receive wireless signals to one or more wireless devices. Communications over the wireless network may be completed by any available standards or protocols including Global System for Mobile communications (GSM), Universal Mobile Telecommunications System (UMTS) Third Generation (3G), Personal Communications Service (PCS), or Ultra Mobile Broadband (UMB), among others.

Further, the wireless network antenna may communicate to wireless devices in simplex (or half-duplex) mode in which the communications travel both from the wireless device to an antenna or from the antenna to the wireless device, but only in one direction at a time. The communications may also utilize full-duplex mode in which communication travels in both directions at one time over one or more channels.

With reference initially to FIG. 1, a wireless network environment 100 suitable for use in implementations of embodiments of the invention is described. The wireless network environment 100 may comprise any geographic area in which wireless network communications are provided. The environment 100 includes a plurality of home-network towers 102, 104, 106, and 108 as well as a plurality of roaming-network towers 102, 110 and 112. A home-network tower 102, 104, 106, and 108 generally comprises a tower having one or more wireless network antennas mounted thereon, but may also comprise any location at which a wireless network antenna for a home network is located. Such locations may include buildings, skyscrapers, bridges, church steeples, mountains, and hillsides, among other structures on which an antenna may be mounted. Similarly, a roaming-network tower 102, 110, and 112 generally comprises a tower having one or more roaming-network antennas mounted thereon, but may also comprise any other structure described above for home-network towers 102-108. Additionally, as depicted by home-network tower 102 and roaming-network tower 102, antennas for more than one network can be mounted on a single tower or at a single location.

Each home-network tower 102-108 has three antennas mounted thereon that each designate a sector A, B, or C about the tower. Each roaming-network tower 102, 110-112 also has three antennas mounted thereon that each designate a sector X, Y, or Z. In embodiments, a home-network tower or a roaming-network tower may have more or fewer than three antennas mounted thereon. The antennas comprise transmitters, receivers, transceivers, or any other available antenna technology for transmitting and receiving radio frequency (RF) signals or any other signal employable in a wireless network communications network. The antennas, and any corresponding subsystems, may operate on single or multiple channels, may be trunked, multiplexed, or utilize any other available systems, protocols, or logic necessary for providing wireless network communications.

Figure 2:
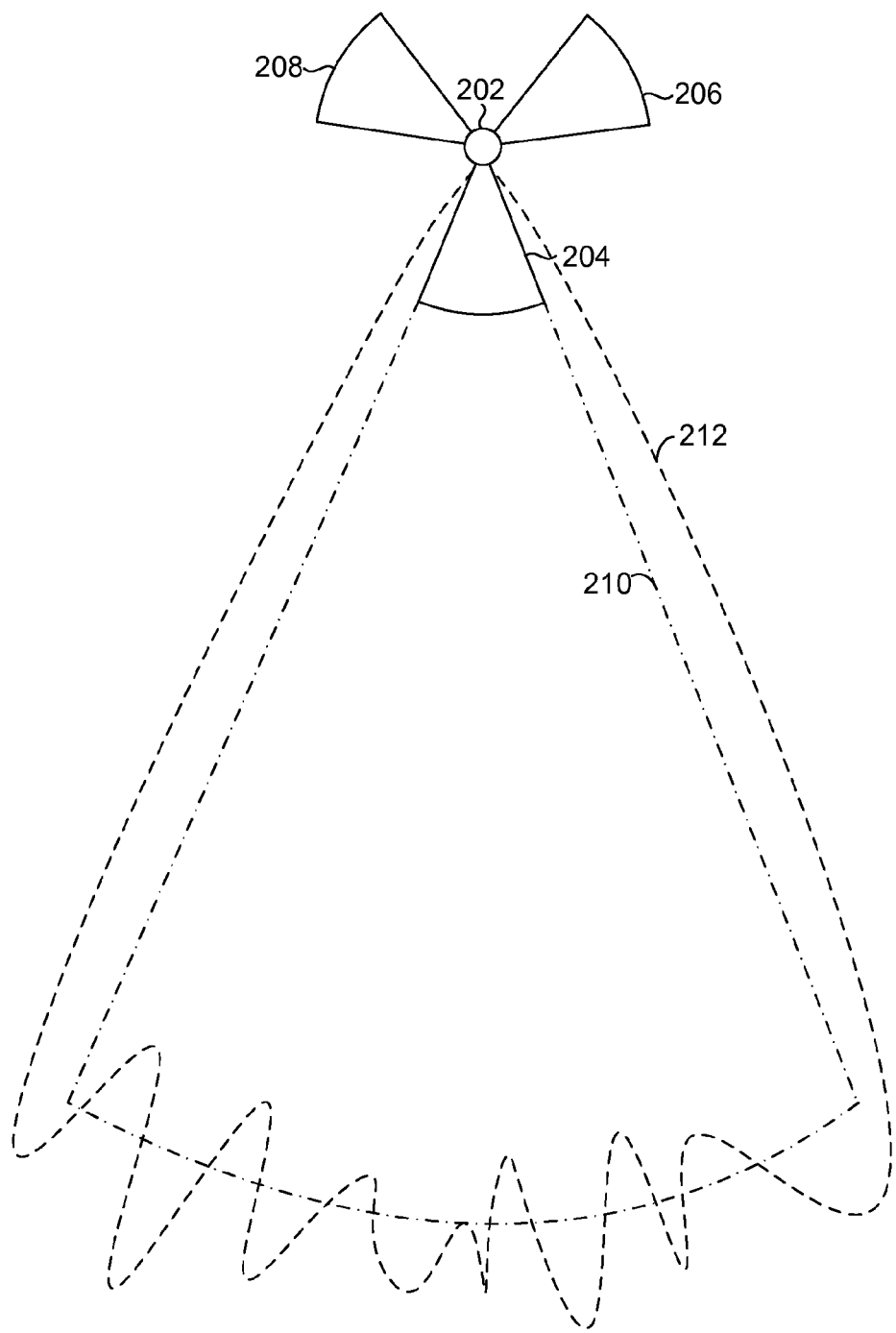
FIG. 2 is an illustration of a wireless-network communications tower depicting a service area of an antenna according to an embodiment of the invention.

With additional reference to FIG. 2, illustrating a wireless network communications tower 202, sectors 204, 206, and 208, each generally depict the direction in which a corresponding antenna is aimed. The mounting of the antennas on the tower 202 and RF shielding around the antennas can be used to aim and adjust the size and location of an area served by an antenna, among other methods. The service area 210 of an antenna may be viewed generally as extending radially outward from the pie shaped wedge depicting the sector 204. In practice, the RF energy from the antenna 102 extends in a more ambiguous form, as depicted by a service area 212, and may change, grow, or retract as more or fewer callers connect thereto.

Figure 3:
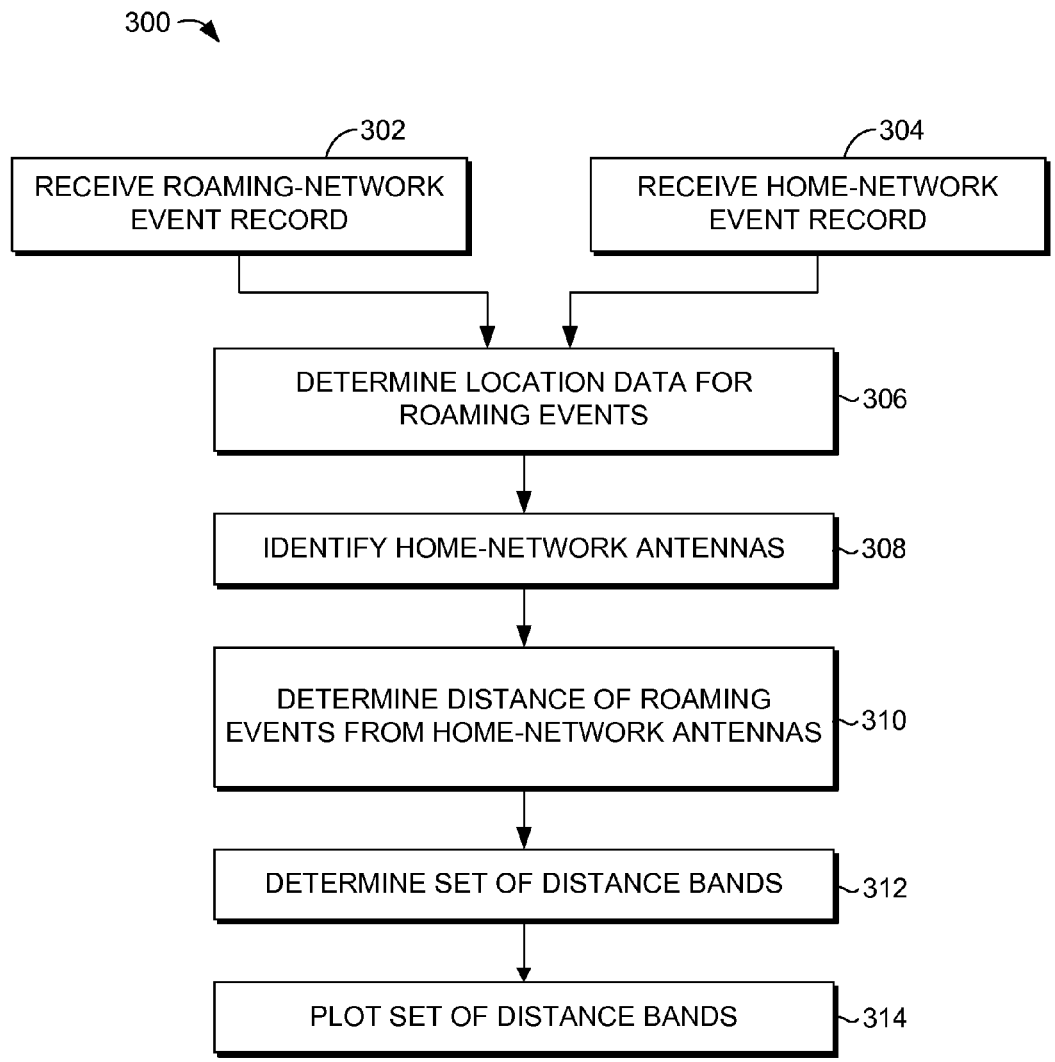
FIG. 3 is a flow diagram depicting a method for generating distance bands on a map to identify areas of outbound roaming on a wireless network according to an embodiment of the invention.

Referring now to FIG. 3, a flow diagram depicting a method for generating distance bands on a map to identify areas of outbound roaming on a wireless network according to an embodiment of the invention is described. A roaming-network event record (hereinafter also referred to as "roaming record") is received, at 302. A roaming record comprises a list of a plurality of roaming events on a roaming network by callers subscribed to a home network (hereinafter "roaming events") as shown for example in Table 1. The record includes roaming data for each roaming event including at least a unique caller identifier and a time stamp. The unique caller identifier comprises any indicia that is useable to identify the caller such as, for example and not limitation, a mobile directory number (MDN), a network address identifier (NAI), or a mobile station identification (MSID). The time stamp includes any indication of one or more of an event start time, an event end time, and an event duration. In an embodiment, the roaming record is a call detail record (CDR) generated by the roaming-network provider and is communicated to the home-network provider for billing purposes.

TABLE 1

Roaming-network event record:

| Caller ID (MDN) | Date | Event Start Time | Event End Time |
|---|---|---|---|
| (999) 999-9999 | Jan. 5, 2009 | 08:25:36 | 08:27:32 |
| (888) 888-8888 | Jan. 5, 2009 | 14:22:21 | 14:22:55 |
| (999) 999-9999 | Jan. 5, 2009 | 15:25:55 | 17:35:58 |
| (777) 777-7777 | Jan. 6, 2009 | 10:44:26 | 10:47:56 |
| (666) 666-6666 | Jan. 6, 2009 | 11:46:38 | 12:48:28 |
| (555) 555-5555 | Jan. 6, 2009 | 20:41:55 | 20:43:20 |
| (999) 999-9999 | Jan. 6, 2009 | 04:58:11 | 04:58:59 |
| (999) 999-9999 | Jan. 6, 2009 | 08:51:34 | 08:15:22 |
| (555) 555-5555 | Jan. 6, 2009 | 20:21:52 | 22:24:52 |
| (888) 888-8888 | Jan. 7, 2009 | 12:00:01 | 01:05:55 |

A home-network event record is received, at 304. The home-network event record (hereinafter also referred to as "network record") comprises a list of a plurality of home-network events created by subscribers on the home network (hereinafter "network events"). The record includes at least a unique caller identifier, a time stamp, and location data for each event, as depicted in Table 2. In an embodiment, the home-network event record is a per call measurement data record (PCMD).

TABLE 2

Home-network event record:

| Caller ID (MDN) | Date | Event Start Time | Event End Time | Location (Tower:Sector) |
|---|---|---|---|---|
| (999) 999-9999 | Jan. 5, 2009 | 08:28:36 | 09:58:16 | 144:A |
| (888) 888-8888 | Jan. 5, 2009 | 15:32:21 | 16:37:27 | 521:C |
| (666) 666-6666 | Jan. 5, 2009 | 14:26:55 | 16:22:15 | 111:A |
| (333) 333-3333 | Jan. 5, 2009 | 03:41:26 | 03:55:53 | 113:B |
| (999) 999-9999 | Jan. 5, 2009 | 12:43:38 | 12:46:58 | 113:B |
| (777) 777-7777 | Jan. 6, 2009 | 22:42:55 | 22:52:57 | 521:A |
| (444) 444-4444 | Jan. 6, 2009 | 06:54:11 | 06:57:14 | 677:A |
| (555) 555-5555 | Jan. 6, 2009 | 19:40:23 | 20:18:43 | 677:A |
| (555) 555-5555 | Jan. 6, 2009 | 22:32:52 | 22:56:15 | 321:A |
| (888) 888-8888 | Jan. 7, 2009 | 01:14:01 | 01:27:12 | 924:C |

As described above with respect to the roaming record, the unique caller identifier comprises any indicia useable to identify the caller, and the time stamp indicates one or more of an event start time, an event end time, and an event duration. The location data comprises any data indicating the location of the caller when the call was connected, during the event, and/or when the event ended. The location data may include an indication of a tower, sector, or antenna to which the caller's wireless device was connected, a distance from said tower or antenna, a longitude, a latitude, a round trip delay measurement, or any other indication of the callers location.

At 306, location data is determined for one or more roaming events by correlating the roaming data in the roaming record with the home-network data in the network record. In an embodiment, the roaming data are compared with the home-network data to identify events made by the same caller. For example, the events can be matched up or sorted by unique caller identifier. In an embodiment, all events in the roaming record and network record that are not matched are removed from further processing. Roaming events that have matching caller identifiers with network events are further compared by time stamps. In an embodiment, only events with matching caller identifiers and timestamps occurring within a predetermined range of each other are retained for further processing and are placed in a matching record. (Table 3 depicts an embodiment of a matching record having cells highlighted to depict time stamps falling within a predetermined range of ten minutes.) In another embodiment, if more than one network event matches with a roaming event within the predetermined time range, only the network event closest in time to the roaming event is retained. The location data for the network event is then adopted into the matching record for the matching roaming event, as shown in Table 4. In an embodiment, other additional home-network data collected in the network record are also adopted into the roaming record for the matching roaming event.

TABLE 3

Matching Roaming Events and Network Events within 10 Minute Time Range

| Caller ID (MDN) | Date | Event Start Time | Event End Time | Location (Tower:Sector) |
|---|---|---|---|---|
| (999) 999-9999 | Jan. 5, 2009 | 08:28:36 | 09:58:16 | 144:A |
| (999) 999-9999 | Jan. 5, 2009 | 08:25:36 | 08:27:32 | ROAM |
| (555) 555-5555 | Jan. 6, 2009 | 19:40:23 | 20:18:43 | 677:A |
| (555) 555-5555 | Jan. 6, 2009 | 22:32:52 | 22:56:15 | 321:A |
| (555) 555-5555 | Jan. 6, 2009 | 20:21:52 | 22:24:52 | ROAM |
| (888) 888-8888 | Jan. 7, 2009 | 01:14:01 | 01:27:12 | 924:C |
| (888) 888-8888 | Jan. 7, 2009 | 12:00:01 | 01:05:55 | ROAM |

Table 4 is below.

TABLE 4

Matching Record:

| Caller ID (MDN) | Date | Event Start Time | Event End Time | Location (Tower:Sector) |
|---|---|---|---|---|
| (999) 999-9999 | Jan. 5, 2009 | 08:25:36 | 08:27:32 | 144:A |
| (555) 555-5555 | Jan. 6, 2009 | 20:21:52 | 22:24:52 | 677:A |
| (888) 888-8888 | Jan. 7, 2009 | 12:00:01 | 01:05:55 | 924:C |

The predetermined time range comprises any desired range of time between a network event and a roaming event. For example, the predetermined range may be measured between a network event end and a roaming event start time or a roaming event end and a network event start time. In an embodiment, the predetermined time range is chosen such that a caller is not able to travel a great distance between events. Limiting the possible geographic distance between events increases the accuracy in adopting the network event location data for the location of a roaming event.

In another embodiment, the predetermined time range is chosen based on the average speed of travel of people in an area in which the network calls were made. For example, a predetermined time range of ten minutes may be chosen in an area in which most people are on foot, such as a college campus or a downtown urban area, because the callers will likely not travel more than a mile in ten minutes. Conversely, a time range of two minutes may be chosen in an area including a major interstate highway on which callers might be traveling at or above sixty-five miles an hour.

Home-network antennas are identified for each roaming event based on the adopted location data, at 308. The distance of each roaming event from a respective antenna is determined, at 310. The distance may be provided in the adopted location data in the matching record or may be calculated. In an embodiment the separation distance between a roaming event and a respective antenna is calculated using the roundtrip delay.

The roundtrip delay is the amount of time it takes a signal to travel from a wireless device to an antenna and back to the wireless device in simplex mode. Knowing the speed at which the signals travel and the time required for the signal to make the roundtrip the roundtrip distance can be calculated. Thus, the distance between the wireless device creating the roaming event and the respective antenna is half the roundtrip distance.

In embodiments, roundtrip delay is used for calculating a caller's distance to an antenna for simplicity, and because a caller is always in contact with at least one antenna. Other methods may require distances and data from more than one antenna to determine a caller's location. In another embodiment, the location of a roaming event is found by triangulating the location through distances from multiple antennas, among other methods. Other methods by which the distance between a wireless device and a wireless network antenna may be calculated are understood as disclosed herein.

The distance of a roaming event from an antenna provides a radial distance by which a circular band, or distance band can be drawn or plotted around the antenna on a map. At 312, a set of distance bands is determined from a plurality of distance bands generated for each of the roaming events associated with the home-network antenna. The set of distance bands is chosen to include a significant proportion of the distance bands. In an embodiment, a significant proportion is a statistically significant proportion. A significant proportion may include a majority of the distance bands.

At 314, the set of distance bands is plotted on a map. In an embodiment, plotting the set of distance bands is completed by generating a single distance band having a width sufficient to encompass each of the distance bands in the set (e.g. a wide distance band is plotted covering an area between an inner most distance band and an outer most distance band in the set).

Figure 4:
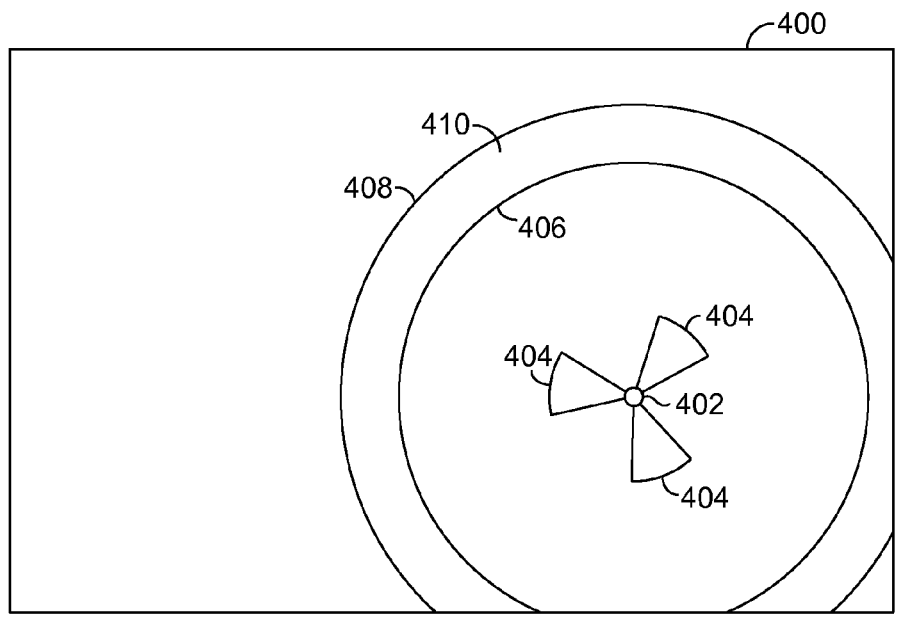
FIG. 4 is an illustration of a distance band plotted on a map according to an embodiment of the invention.

FIG. 4 depicts one such embodiment in which distance bands are plotted on a map 400. As described above, a home-network tower 402 having three antennas corresponding to three sectors 404 is identified as servicing an area in which one or more roaming events were created. The distance of the one or more roaming events from the tower 402 is determined to lie between an inner boundary 406 and an outer boundary 408. The inner boundary 406 indicating the distance of the roaming event closest to the tower 402 and the outer boundary 406 indicating the distance of the roaming event farthest from the tower 402. The area between the inner boundary 406 and the outer boundary 408 comprises a distance band 410. In an embodiment, a statistically significant number of roaming events occur within the distance band 410, as described more fully below.

By plotting distance bands for roaming events about an antenna, the area of the map and the geographic area in which a wireless-network provider must investigate to identify causes of outbound roaming are greatly reduced. Further, where a structure, building, or other land feature is identified within the distance band a provider may be able to pinpoint a cause of outbound roaming. In an embodiment, the distance band 410 might be better illustrated as having grey or fuzzy boundaries. As such, the distance band 410 provides an estimated region in which outbound roaming has occurred. In practice, outbound roaming events might occur within the distance band 410 or within close proximity thereto. Such may be a consequence of the degree of accuracy imparted in adopting the home-network location data as location data for roaming events and the distance that a caller might travel between the network event and the roaming event, among other factors.

In an embodiment, the home-network antennas, or towers, identified as servicing areas in which outbound roaming events have occurred are ranked based on the number of outbound roaming events occurring within those service areas. By doing so, a home-network provider may prioritize efforts to reduce the number of outbound roaming events based on the event volume at each identified antenna or tower. The home-network antennas or towers might also be ranked on cost associated with outbound roaming among other data contained within the roaming record or network record, or that is calculable therefrom.

Figure 5:
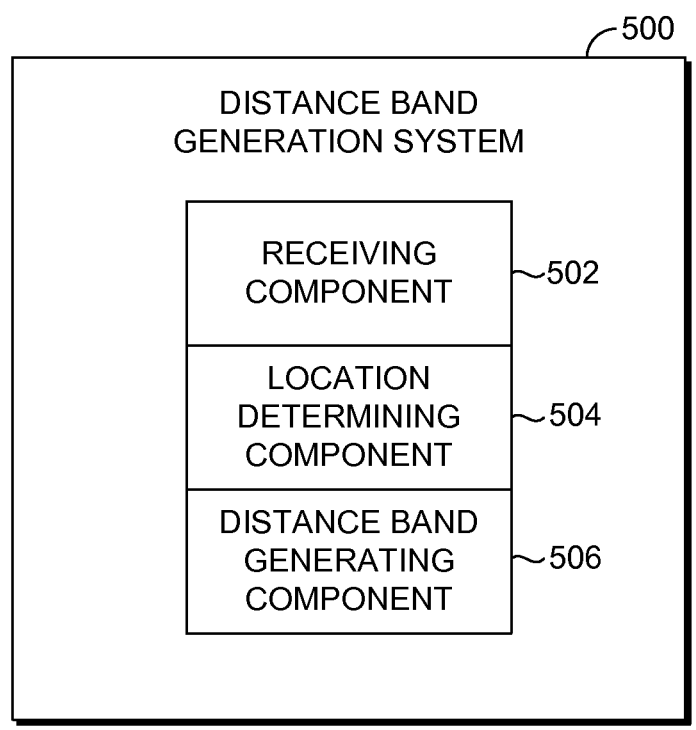
FIG. 5 is a block diagram depicting a system for generating distance bands on a map to identify areas of outbound roaming on a wireless network according to an embodiment of the invention.

With reference now to FIG. 5, a block diagram depicting a distance band generation system 500 for generating distance bands on a map to identify areas of outbound roaming on a wireless network is described according to an embodiment of the invention. The system includes a receiving component 502, a location determining component 504, and a distance band generating component 506. The receiving component 502 receives roaming-network event records and home-network event records as described above. The location determining component 504 determines location data for one or more outbound roaming events by matching outbound roaming events from the roaming-network event record with network events of the home-network event record having the same unique caller identifier and having time stamps within a predetermined range. The location determining component 504 adopts the matching home-network event location data into the roaming-network event record for each matching outbound roaming event. The distance band generating component 506 determines a corresponding home-network antenna for each matched outbound roaming event based on the adopted location data. The distance band generating component 506 generates one or more distance bands on a map with respect to the corresponding home-network antennas. In embodiments, the distance band generating component 506 ranks one or more home-network antennas by the number of outbound roaming events occurring in areas serviced thereby to allow a network provider to prioritize network improvements and repairs based on an outbound roaming event volume.

In another embodiment, the distance band generating component 506 only plots statistically significant distance bands. To determine statistically significant distance bands the distance band generating component 506 might use histograms and/or cumulative distribution functions, among others. In an embodiment, the distance band generating component 506 employs a cumulative distribution function to identify statistically significant concentrations of outbound roaming events based on their distance from a tower or antenna. Knee points (points along the cumulative distribution function at which significant changes in slope or rate occur) are used to identify inner boundaries and outer boundaries of a distance band, as described above with respect to FIG. 4.

Figure 6:
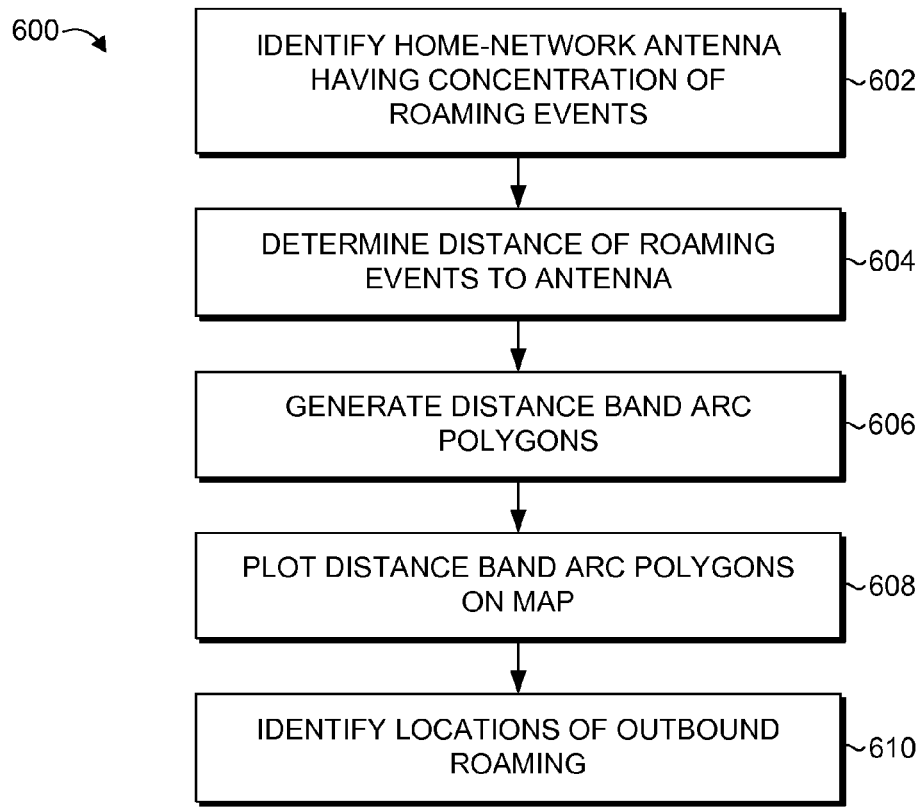
FIG. 6 is a flow diagram depicting a method for generating distance bands on a map to identify areas of outbound roaming on a wireless network according to an embodiment of the invention.

Referring now to FIG. 6, a flow diagram depicting a method 600 for generating distance bands on a map to identify areas of outbound roaming on a wireless network according to an embodiment of the invention is described. At 602, a home-network wireless-communications antenna (network antenna) is identified in which a concentration of outbound roaming events have occurred. The network antenna corresponds with a cell sector indicating the service area of the antenna. In an embodiment, a cell sector in which the most outbound roaming events have occurred is identified. In another embodiment, the data of the matched records is sorted based on location such as by city, state, or region and a cell sector having the most outbound roaming events in a selected city, state, or region is identified. It is understood that numerous methods exist for sorting the data to identify cell sectors, towers, or locations, all of which are hereby incorporated herein by reference.

Figure 7:
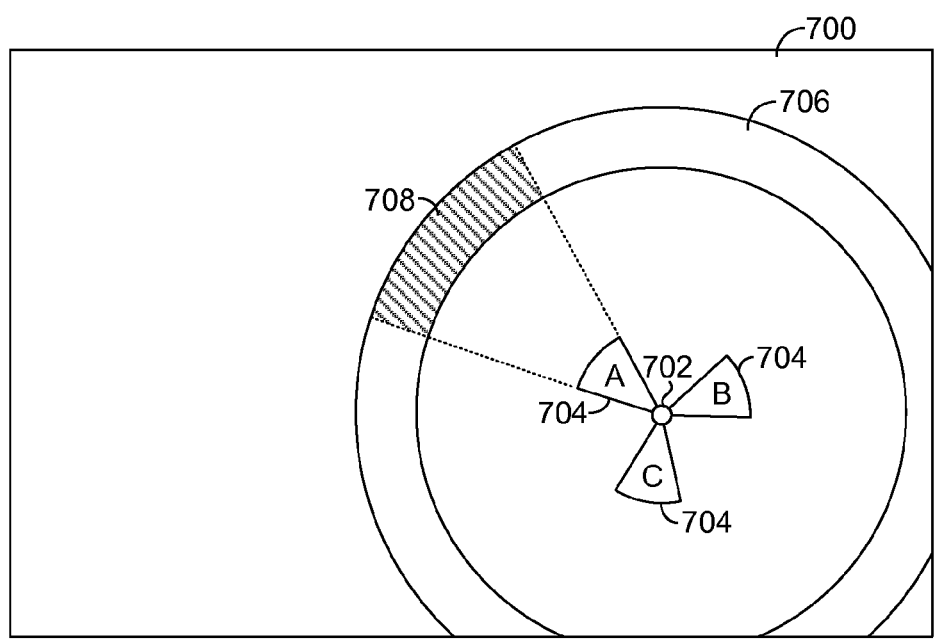
FIG. 7 is an illustration of a distance band arc polygon plotted on a map according to an embodiment of the invention.

Distance bands are generated by determining the separation distance of outbound roaming events from the identified antenna, at 604. Distance band arc polygons are generated from the intersection of the distance bands and an extrapolation of the cell sector (606) corresponding to the identified antenna, as depicted in FIG. 7, described below. The distance band arc polygons are plotted on a map, at 608, and locations of outbound roaming are identified, at 610.

FIG. 7 depicts a map 700 on which a home-network wireless-communications tower 702 is located. The tower 702 has three antennas mounted thereon, each of which associated with a cell sector 704A-C. A distance band 706 is plotted on the map 700 indicating a circular region around the tower 702 in which outbound roaming events have occurred. As described above, cell sector 704A for example, might be identified as servicing a concentration of outbound roaming events. Therefore, the wedge shape representing the cell sector 704A is extrapolated radially outward from the tower 702 to identify an intersection of the cell sector 704A and the distance band 706. The intersection forms an arc polygon 708. The arc polygon 708 identifies a region in which the concentration of outbound roaming events has occurred. In an embodiment, due to the non-uniformity of the service area of the cell sector 704A, such as described previously with respect to the service area 212 of FIG. 2, an actual region may not exactly match that depicted by the arc polygon 708.

Figure 8:
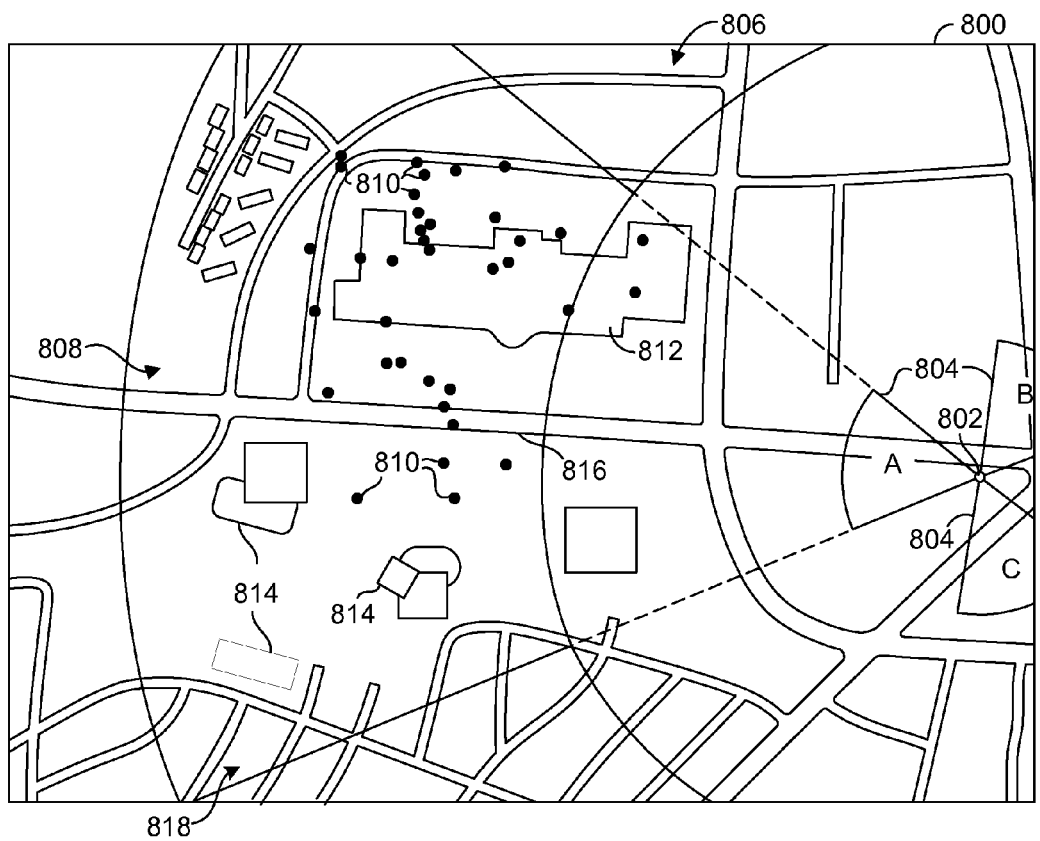
FIG. 8 is an illustration of a distance band arc polygon and additional data plotted on a map according to an embodiment of the invention.

With additional reference to FIG. 8, a map 800 depicts a tower 802 having three cell sectors 804A-C according to another embodiment of the invention. As described above, a distance band 806 is plotted on the map 800 and an arc polygon 808 is identified by extrapolating the wedge shape representing the cell sector 804A radially outward from the tower 802. Additional data points 810 are also plotted on the map 800 to aid in identifying locations of outbound roaming within the arc polygon 808. The additional data points 810 may indicate any desired data, but preferably represent data that might be related to network conditions causing outbound roaming. In an embodiment, the additional data points 810 comprise locations in which network events were dropped or disconnected due to network conditions.

As shown by FIG. 8, specific locations within the arc polygon 808 may be identified as locations where outbound roaming has occurred. For example, within the arc polygon 808 there is a shopping center 812, various other buildings 814, a highway 816, and a portion of a neighborhood 818, among other structures and land features. Further, in an embodiment such as depicted in FIG. 8, the additional data points 810 appear to cluster around an area of the shopping center 812. Thus, a wireless-network provider might conclude that the outbound roaming has occurred at the shopping center 812 and may send test units to the shopping center to confirm such a conclusion. For example, the provider may determine that the construction materials of the shopping center 812 hinder the ability of the RF signals from the tower 802 to enter the shopping center. Thus, the provider may install one or more antennas on or inside the shopping center 812 to insure that subscribers making a call from within the structure connect to the home network and not to a roaming network.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. Non-transitory computer-readable storage media having computer-executable instructions embodied thereon that, when executed, perform a method for associating location data with an outbound roaming call on a wireless network, the method comprising:

receiving a roaming-network event record comprising roaming data that describes a plurality of roaming events on a roaming network, the roaming data including a first caller identifier and a first time stamp for each roaming event in the plurality of roaming events;

correlating the roaming data with home-network data in a home-network event record, the home-network data describing a plurality of network events on a home network and including a second caller identifier, a second time stamp, and location data for each network event in the plurality of network events;

identifying one or more locatable roaming events in the plurality of roaming events;

determining location data for the one or more locatable roaming events based on the home-network data;

plotting the locatable roaming events on a map based on the location data adopted from the home-network event; and identifying one or more of a home-network antenna that has a concentration of locatable roaming events within a service area thereof or a geographic location that includes a concentration of locatable roaming events.

2. The non-transitory computer-readable storage media of claim 1, wherein correlating the roaming data with the home-network data further comprises:

identifying a roaming event in the roaming-network event record having a first caller identifier matching a second caller identifier of a network event in the home-network event record.

3. The non-transitory computer-readable storage media of claim 2, wherein identifying one or more locatable roaming events in the plurality of roaming events further comprises:

determining that the first time stamp associated with the roaming event is within a predetermined range of the second time stamp associated with the network event in the home-network event record.

4. The non-transitory computer-readable storage media of claim 3, wherein determining location data for the one or more locatable roaming events based on the home-network data further comprises:

adopting the location data of the network event in the home-network event record as location data for the locatable roaming event.

5. The non-transitory computer-readable storage media of claim 3, wherein the predetermined range is set based on the average speed of travel of callers in an area including the service area of the identified home-network antenna.

6. The non-transitory computer-readable storage media of claim 1, wherein the roaming-network event record and the home-network event record are one or more of a call detail record (CDR) and a per call measurement data (PCMD) record.

7. The non-transitory computer-readable storage media of claim 1, wherein the first caller identifier and the second caller identifier are mobile directory numbers (MDN).

8. The non-transitory computer-readable storage media of claim 1, wherein the location data for each network event includes an indication of one or more of a tower, a sector, an antenna, a distance from a tower or antenna, a longitude, a latitude, and a round trip delay measurement.

9. The non-transitory computer-readable storage media of claim 1, wherein the first time stamp provided in the roaming-network event record and the second time stamp provided in the home-network event record include one or more of an event start time, an event end time, and an event duration.

* * * * *